United States Patent [19]

Höhlein et al.

[11] 4,410,663

[45] Oct. 18, 1983

[54] STORABLE, SAPONIFICATION-RESISTANT AQUEOUS LACQUER BINDERS

[75] Inventors: Peter Höhlein, Kempen; Jochen Schoeps, Krefeld, both of Fed. Rep. of Germany

[73] Assignee: Bayer Aktiengesellschaft, Leverkusen, Fed. Rep. of Germany

[21] Appl. No.: 377,625

[22] Filed: May 13, 1982

[30] Foreign Application Priority Data

May 19, 1981 [DE] Fed. Rep. of Germany ....... 3119928

[51] Int. Cl.$^3$ .............................................. C08L 61/28
[52] U.S. Cl. ................................... 525/162; 524/512; 525/161
[58] Field of Search ................. 524/512; 525/161, 162

[56] References Cited

U.S. PATENT DOCUMENTS 4,276,210  6/1981  Höhlein et al. ..................... 524/512

Primary Examiner—Theodore E. Pertilla
Attorney, Agent, or Firm—Connolly and Hutz

[57] ABSTRACT

This invention relates to lacquer binders which can be diluted with water, consisting of a mixture of:

A. 50-94% by weight, preferably 55-80% by weight of a copolymer consisting of copolymerized units of
  a. 30-65% by weight of an aromatic vinyl or isopropenyl compound having 8-14 C-atoms or of a methacrylic acid alkyl ester having 1-4 C-atoms in the alcohol component or mixtures thereof,
  b. 10-30% by weight of at least one acrylic acid alkyl ester having 1-8 C-atoms in the alcohol component,
  c. 1-20% by weight of maleic acid, fumaric acid, itaconic acid or semiesters thereof having 1-8 C-atoms in the alcohol component, or (meth)acrylic acid or mixtures of the aforesaid monomers,
  d. 0-20% by weight of at least one hydroxyalkyl ester of (meth)acrylic acid having 2-4 C-atoms in the alkyl group or glycidyl (meth)acrylate or mixtures of the aforesaid monomers,
  e. 10-30% by weight of N-methylol(meth)acrylic acid amide or N-methoxymethyl (meth)acrylic acid amide, preferably N-methoxymethyl(meth)acrylic acid amide, and
  f. 2-40% by weight of a reaction product of an allyl glycidyl ether and aliphatic, cycloaliphatic, araliphatic or aromatic monocarboxylic acid having 2-30 C-atoms or mixtures thereof, preferably saturated aliphatic branched chain monocarboxylic acids having 5-20 C-atoms, in particular α-ethyl-hexanoic acid isononanoic acid; and
B. 6-50% by weight, preferably 20 to 55% by weight of an aminoplast resin; and
C. 0-30% by weight, based on the copolymer, of a lactam, 30-100% of the number of carboxyl groups of component A.c. incorporated in the copolymer being neutralised by ammonia or mono- or polyamines.

4 Claims, No Drawings

STORABLE, SAPONIFICATION-RESISTANT AQUEOUS LACQUER BINDERS

This invention relates to lacquer binders containing carboxyl groups, based on a mixture of a copolymer containing carboxyl groups and aminoplast resin, which binders can be diluted with water after neutralisation of the carboxyl groups and are suitable for the production of stoving lacquers which are storable and resistant to saponification.

Solution polymers of acrylic monomers are used for the formulation of top-coat lacquers or one-coat lacquers by virtue of their characteristics such as resistance to yellowing, resistance to outdoor conditions and gloss retention, qualities in which the consumer demands an exceptionally high standard for such lacquers.

At the present time, these binders are in most cases dissolved in organic solvents so that problems connected with pollution of the atmosphere arise in the application of the lacquers produced from them.

The water-soluble binders and lacquers used at the present time which are based on solution polymers of acrylic monomers still contain relatively large quantities of solvents which contaminate the environment. The need to use these solvents is due to the viscosity of the binders when they are diluted with water.

Lacquer formulations capable of being dissolved, diluted or dispersed in water are known, which contain binders consisting of aminoplast resins and acrylate copolymers containing carboxyl groups. None of these formulations, however is entirely satisfactory for the purpose of producing one-coat lacquers which are storable and resistant to saponification. Such lacquers must fulfil a variety of requirements. They must be suitable for use as stoving lacquers and should contain as small a proportion as possible, if any, of organic solvents liable to pollute the environment. Furthermore, the lacquer coat obtained must be resistant to saponification and must not have a tendency to yellowing. It must also have the usual characteristics of lacquers, such as gloss, hardness, firmness of adherence and elasticity.

It was therefore an object of the present invention to provide lacquer binders with a high solid content suitable for the production of coatings with a high body content which would be capable of dilution with water and stable in storage without undergoing saponification and would give rise to gloss films which after stoving would be detergent-resistant and have good lacquer technical characteristics.

The problem was solved by using mixtures of aminoplast resin and a copolymer of special monomers as binders.

The present invention thus provides lacquer binders capable of being diluted with water, consisting of a mixture of A. 50–94% by weight, preferably 55–80% by weight of a copolymer consisting of copolymerised units of
 a. 30–65% by weight of an aromatic vinyl or isopropenyl compound having 8–14 C-atoms or of a methacrylic acid alkyl ester having 1–4 C-atoms in the alcohol component, or mixtures thereof;
 b. 10–30% by weight of at least one acrylic acid alkyl ester having 1–8 C-atoms in the alcohol component;
 c. 1–20% by weight of maleic acid, fumaric acid, itaconic acid or semiesters thereof having 1–8 C-atoms in the alcohol component, (meth)acrylic acid or mixtures of the aforesaid monomers;
 d. 0–20% by weight of at least one hydroxyalkyl ester of (meth)acrylic acid having 2–4 C-atoms in the alkyl group or glycidyl (meth)acrylate or mixtures of the aforesaid monomers;
 e. 10–30% by weight of N-methylol(meth)acrylic acid amide or N-methoxymethyl (meth) acrylic acid amide, preferably N-methoxymethyl(meth)acrylic acid amide; and
 f. 2–40% by weight of a reaction product of an allyl glycidyl ether and aliphatic, cycloaliphatic, araliphatic or aromatic monocarboxylic acids having 2–30 C-atoms or mixtures thereof, preferably saturated, aliphatic branched chain monocarboxylic acids having 5–20 C-atoms, in particular α-ethylhexanoic acid or isononanoic acid, and B. 6–50% by weight, preferably 20–45% by weight of an aminoplast resin and C. 0–30% by weight, based on the copolymer, of a lactam, 30–100% of the number of carboxyl groups of component A.c incorporated in the copolymer being neutralised by ammonia or mono- or polyamines.

The following compounds given by name or formula are specific examples of components belonging to groups A–C:

Group A.a:
 Styrene, α-methylstyrene, o- and p-chlorostyrene, o-, m- and p-methylstyrene, p-tert.-butylstyrene and optionally mixtures thereof; styrene is preferred.

Group A.b:
 Ethyl acrylate, methylacrylate, n- and iso-propyl acrylate, n-butylacrylate, 2-ethyl-hexylacrylate, isooctylacrylate, tert.-butylacrylate and mixtures thereof; acrylic acid alkyl esters having 1–4 carbon atoms in the alcohol component are preferred;

Group A.c:
 Methyl, ethyl, n- and isopropyl, butyl, tert.-butyl, 2-ethylhexyl, and cyclohexyl semiesters of maleic acid, fumaric acid or itaconic acid, preferably of maleic acid; acrylic acid, methacrylic acid and mixtures of the above mentioned acid monomers; acrylic acid, methacrylic acid and/or maleic acid semiesters having 4–8 C-atoms in the alcohol component are preferred;

Group A.d:
 2-hydroxyethyl(meth)acrylate, 2-hydroxypropyl (meth)acrylate, 4-hydroxybutyl(meth)acrylate, trimethylolpropane mono(meth)acrylate, pentaerythritol mono(meth)acrylate, glycidyl(meth) acrylate or mixtures thereof; preferably 2-hydroxypropyl(meth)acrylate;

Group A.e:
 N-methylolacrylic acid amide, N-methylolmethacrylic acid amide, N-methoxymethyl(meth) acrylamide; preferably N-methoxymethylacrylamide;

Group A.f:
 reaction products of an allylglycidyl ether with acetic acid, α-ethylhexanoic acid, isononanoic acid, cyclohexane monocarboxylic acid, benzoic acid, stearic acid, propionic acid, butyric acid, valeric acid, etc., in particular with α-ethylhexanoic acid and isononanoic acid;

Group B.:
 aldehydic condensation products of melamine, urea and benzoguanamine are examples of suitable aminoplast resins. The aldehyde used is generally formaldehyde although usable products are also obtained with other aldehydes, such as acetaldehyde, crontonaldehyde, acrolein, benzaldehyde and furfuryl aldehyde. The methylol groups of the aminoplasts may be etherified with saturated aliphatic monohydric alcohols having 1-4 C-atoms. Melamine and urea resins are preferred. Particularly preferred are melanine-formaldehyde condensation products which are either not etherified or etherified with saturated monohydric alcohols having 1-4 C-atoms (see French Pat. No. 943 411 or D. H. Solomon, The Chemistry of Organic Filmformers, 235-240, John Wiley & Sons, Inc., New York, 1967).

Group C:

Lactams Corresponding to the formula

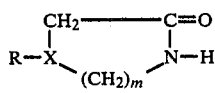

wherein

X denotes a CH group, in which case

R denotes hydrogen and m denotes zero or an integer from 1 to 9; or

X denotes a nitrogen atom, in which case

R denotes a saturated aliphatic group, preferably methyl, an araliphatic group having 7-12 carbon atoms or an unsubstituted pyridine group or a pyridine group substituted by lower alkyl groups ($C_1$-$C_4$), and m represents the number 3.

The following lactams are preferred: 1-N-methylhexahydro-1,4-diazeinone-3; ω-dodecyllactam; γ-butyrolactam; δ-valerolactam; and particularly ε-caprolactam.

The copolymer resin (component A) may be prepared by copolymerisation of the components a-f by the usual methods, preferably by radical polymerisation carried out either solvent-free or in solution. This polymerisation may be carried out at temperatures of from 70° C. to 160° C., preferably from 100° C. to 150° C.

Monomers a-f are incorporated in the copolymer resin in substantially the same proportions in which they are used for polymerisation and their distribution in the copolymer is substantially statistical.

Preferred initiators for carrying out radical polymerisation include, for example, symmetric aliphatic azo compounds such as azo-bis-isobutyric acid nitrile, azo-bis-2-methyl-valeronitrile, 1,1'-azo-bis-1-cyclohexane nitrile, and 2,2'-azo-bis-isobutyric acid alkyl esters; symmetric diacylperoxides, e.g. acetyl, propionyl or butyryl peroxide benzoyl peroxides substituted with bromo, nitro, methyl or methoxy groups, and lauroyl perioxides; symmetric peroxydicarbonates, e.g. diethyl, diisopropyl, dicyclohexyl and dibenzyl peroxydicarbonate; tert.-butyl peroctoate or tert.-butyl phenylperacetate and peroxy carbonates such as tert.-butyl-N-(phenyl-peroxy)-carbamate or tert.-butyl-N-(2,3-dichlororoor-4-chlorophenyl-peroxy)- carbamate. The following peroxides are also preferred: tert.-butyl hydroperoxide, ditert.-butylperoxide, cumene hydroperoxide, dicumeneperoxide and tert.-butylperpivalate.

The initiators may be in quantities of from 0.2 to 8.0% by weight, based on the total quantity of monomers. Conventional regulators may also be used for polymerisation in quantities of from 0.1 to 5% by weight, based on the total quantity of monomers.

Solution polymerisation may be carried out in inert solvents such as ethanol, propanol, isopropanol, n- or iso-butanol, methyl ethyl ketone, toluene, xylene, butyl acetate and butyl glycol, etc.

If desired, lactams may be used in addition to the solvents but not in quantities greater than 30% by weight, based on the copolymer.

Since the lactams used are saturated, they do not react with the monomers to undergo copolymerisation but react with a cross-linking agent by way of their reactive NH group. The lactams used are mainly non-volatile and are therefore left in the film when this is hardened.

After preparation of the copolymers, the volatile constituents in the copolymers may be removed at temperatures of 140° C. to 200° C., either at normal pressure in evaporator coils by injecting an inert gas such as nitrogen or steam in quantities of 0.1 to 1. $m^3$ to 1 kg of resin melt or under vacuum in an evaporation apparatus such as a falling film evaporator a thin layer evaporators an evaporator screw, a pressure release evaporator or a spray evaporator.

The average molecular weights and the molecular nonuniformities of the copolymer resins were determined by gel permeation chromatography (GPC) on styrogels, using tetrahydrofuran as eluant. After universal calibration (according to Z. Grubisic, P. Rempp and H. Benoit, J. Polymer Sci. Part B, Polymer Letters 5 (1967) 745), the average molecular weight values $\overline{M}_w$ and $\overline{M}_n$ were determined from the distribution of the chromatograms. The polymers have average molecular weights of $\overline{M}_n$=2000-50,000, preferably $\overline{M}_n$=2000 to 15,000, and molecular non-uniformities U ($U=\overline{M}_w/\overline{M}_n-1$, where $\overline{M}_w$=average weight, $\overline{M}_n$=numerical average of molecular weight) of from 0.5 to 2000.

After preparation of the copolymers, these may be mixed with lactams. If polymerisation was carried out in a lactam, mixing with a lactam is unnecessary, or any additional quantity of lactam required may be added.

If the copolymer contains glycidyl groups, it may be modified by a reaction with fatty acids. Air drying binders may be obtained when unsaturated fatty acids are used.

Following the preparation of the copolymer, the carboxyl groups in the copolymer are partially or completely neutralised. Neutralisation may be carried out either in the absence or presence of the lactam and optionally in the presence of other convention solvents and either in the presence or absence of the aminoplast resin. The degree of neutralisation is preferably from 30 to 100%, i.e. for each 1 gramme equivalent of carboxyl groups present, from 0.3 to 1 gamme equivalents thereof are neutralised. This results in a pH of the aqueous coating in the region of 5 to 10. The pH of the aqueous coating is preferably 7-9.

The neutralising agents used may be ammonia or mono- or polyamines. The following are specific examples: ammonia, ethylamine, diethylamine, triethylamine, trimethylamine, mono-, di- and triethanolamine and dimethylethanolamine; preferably dimethylethanolamine.

The binders according to the invention consisting of the copolymer containing partially or completely neutralised carboxy groups and the aminoplast may be diluted with water, optionally in the presence of organic solvents.

Examples of suitable organic solvents include alcohols having 1 to 4 C-atoms, such as methanol, ethanol, n- and iso-propanol and butanols; acetic acid esters having 2–4 C-atoms in the alcohol component, such as ethyl and butyl acetate and ethyl glycol acetate, ethylene glycol monoalkyl ethers having 1–4 C-atoms in the alkyl group, such as the monomethyl, monoethyl and monobutylethers of ethylene glycol; aliphatic and alicyclic ketones such as methyl ethyl ketone, methyl isobutyl ketone, cyclohexanone and acetone; and lower ethers such as tetrahydrofuran, or mixtures of the above mentioned solvents.

The aqueous stoving lacquers obtained from the binders according to the invention, after dilution with water, optionally in the presence of organic solvents, may contain white pigments, in particular titanium dioxide, in quantities of from 10–100% by weight, based on the binders. They may, in addition, contain inorganic or organic coloured pigments in quantities of up to 5% by weight, fillers also in quantities of up to 10% by weight, waxed in quantities of up to 10% by weight to increase the scratch resistance, and conventional hardening catalysts in quantities of up to 1% by weight, based in each case on the quantity of binder.

The coating compounds prepared as described above may be applied by the usual methods, e.g. by reversal roller coating, spraying, brush-coating, immersion or similar conventional methods.

The substrates to be coated or covered may be metals, glass, plastics or ceramic materials, in particular metals.

Hardening is generally carried out at temperatures of from 80° C. to 250° C. It is sometimes advantageous to begin hardening at a temperature below 120° C. then complete the process at a temperature above 120° C.

When the coating compounds prepared from the binders according to the invention have been hardened, they provide coatings which have advantageous technical characteristics and good resistance to chemicals and to weathering. The aqueous stoving lacquers obtained from the binders according to the invention are suitable, in particular, for producing metallic surfaces on domestic appliances such as dishwashers, washing machines and refrigerators since the coatings are exceptionally resistant to detergents and solvents and have a high gloss and excellent surface hardness.

The parts and percentages given in the examples are based on weight unless otherwise indicated.

EXAMPLE 1

1029 g of ethyl glycol were introduced into a glass vessel equipped with a reflux condenser, heating and cooling means and metering device, and heated to 110° C. A mixture of 180 g of the addition product of allyl glycidyl ether and α-ethylhexanoic acid, 353.4 g of butyl acrylate, 804.6 g of styrene, 103.5 g of acrylic acid, 282.9 g of N-methoxymethyl-acrylic acid amide and 9.6 g of mercapto ethanol was added at 110° C. in the course of 3 hours. At the same time, a mixture of 66.0 g of tert.-butyl peroctoate and 171.0 g of ethyl glycol was added dropwise within a period of 4 hours. The reaction mixture was then stirred for 2 hours at 110° C. After filtration under pressure, a resin having an acid number of 26 determined in the solution, a viscosity of 2634 mPa.s and a solid content of ca. 53.5% by weight was obtained.

The copolymer itself consists of copolymerised units of 10.44% of the addition product of allyl glycidyl ether and α-ethyl-hexanoic acid, 20.5% of butyl acrylate, 46.66% of styrene, 6.00% of acrylic acid and 16.40% of N-methoxymethylacrylic acid amide.

The copolymer has an average molecular weight $\overline{M}_n$ of 5210 and a molecular non-uniformity U of 1.47.

COMPARISON EXPERIMENT 1 (without the reaction product of allylglycidylether + α-ethylhexanoic acid)

1029 g of ethyl glycol were introduced into glass vessel equipped with reflux condenser, heating and cooling means and a metering device, and heated to 110° C. A mixture of 180.0 g of 2-hydroxypropylmethacrylate, 353.4 g of n-butylacrylate, 804.6 g of styrene, 103.5 g of acrylic acid, 282.9 g of N-methoxymethyl acrylic acid amide and 9.6 g of mercaptoethanol was added at 110° C. in the course of 3 hours. At the same time, a mixture of 66 g of tert-butyl peroctoate and 171 g of ethyl glycol was added dropwise within a period of 4 hours. The reaction mixture was then stirred for 2 hours at 110° C. After filtration under pressure, a viscous resin having a solid content of ca. 53.5% by weight was obtained.

Determination of the solid content was carried out, as also in the subsequent examples, by applying 1 g of resin solution to a metal lid 7.5 mm in diameter to form a layer of ca. 50 μm in thickness, and heating it to 80° C. for one hour in an air circulating drying cupboard.

The copolymer consist of copolymerised units of 10.44% of 2-hydroxypropylmethacrylate, 20.5% of butyl acrylate, 46.66% of styrene, 6.00% of acrylic acid and 16.40% of N-methoxymethylacrylic acid amide.

The copolymer has an average molecular weight $\overline{M}_n$ of 4890 and a molecular non-uniformity U of 1.83.

EXAMPLE 2

The method was the same as described in Example 1 with the exception of the monomer mixture used. The monomer mixture used in Example 2 had the following composition: 180 g of the addition product of allylglycidyl ether and isononanoic acid, 353.4 g of butyl acrylate, 804.6 g of styrene, 103.4 g of acrylic acid, 282.9 g of N-methoxy-methylacrylic acid amide and 9.6 g of mercaptoethanol.

The resin obtained has an acid number of 27 measured in solution, a viscosity of 1897 mPa.s and a solid content of ca. 54.0% by weight. The copolymer consists of copolymerised units of 10.44% of the addition product of allyl glycidyl ether and isononanoic acid, 20.5% of N-butylacrylate, 46.66% of styrene, 6.00% of acrylic acid and 16.40% of N-methoxymethylacrylic acid amide.

It has an average molecular weight $\overline{M}_n$ of 3570 and a molecular non-uniformity U of 2.04.

EXAMPLE 3

The method was the same as described in Example 1 except that the monomer mixture used, had the following composition: 180 g of the addition product of allyl glycidyl ether and α-ethyl-hexanoic acid, 353.4 g of butyl acrylate, 804.6 g of styrene. 103.5 g of acrylic acid, 282.9 g of N-methoxymethylmethacrylic acid amide and 9.6 g of mercaptoethanol. The resin obtained had an acid number of 25 determined in solution, a viscosity of 3496 mPa.s and a solid content of ca. 54% by weight.

The copolymer consists of copolymerised units of 10.44% of the addition product of allyl glycidyl ether and α-ethyl-hexanoic acid, 20.5% of butyl acrylate, 46.66% of styrene, 6.00% of acrylic acid and 16.40% of N-methoxymethylmethacrylic acid amide.

The copolymer has an average molecular weight $\overline{M}_n$ of 6305 and a molecular non-uniformity U of 2.37.

Preparation of a white lacquer and a lacquer film produced from it:

100 parts of the resins described above (Examples 1 to 3 and comparison 1) are neutralised with 4.34 parts of dimethylethanolamine. 27.12 parts of titanium dioxide of the rutile type and 15.46 parts of water are added in each case to 7.84 parts of the neutralised resin to prepare the formulations which are to be triturated in the pebble mill.

These formulations are converted into lacquers with and without the addition of ε-caprolactam as reactive diluent. Two test formulations are therefore obtained, referred to below as a. and b.

|  | a. in parts | b. in parts |
|---|---|---|
| Formulation for trituration containing neutralised resins of Examples 1-3 or comparison Example 1 | 50.42 | 50.42 |
| Resin from Examples 1-3 and Comparison Example 1 | 34.52 | 26.05 |
| ε-caprolactam | — | 4.53 |
| Hexamethoxymethylmelamine | 4.54 | 4.54 |
| p-toluenesulphonic acid, 10% in IPA[1] | 0.54 | 0.54 |
| Commercial levelling agent | 0.30 | 0.30 |
| Water | 9.68 | 13.62 |
|  | 100.00 | 100.00 |
| Adjustment to spraying viscosity = 51 s in 4 mm cup (DIN 53 211) with butyl glycol/water 1:1 | 28.5 | 18.7 |

[1] IPA = isopropylalcohol

The white lacquers obtained from the formulations containing the neutralised copolymer resins of Examples 1 to 3 and of comparison example 1 and the unneutralised copolymers of Examples 1-3 and of comparison Example 1 without the addition of ε-caprolactam are referred to as white lacquers 1a, 2a, 3a and comparison 1a while the same white lacquers with the addition of ε-caprolactam are referred to as white lacquers 1b, 2b, 3b and comparison 1b.

The white lacquer obtained was in each case applied to zinc phosphatised steel sheets by spraying (thickness of dry film layer ca. 25 to 30 μm) and stoved in a circulating air drying cupboard for 10 minutes at 180° C. Test for detergent resistance:

The lacquered test sheets (thickness of films 30 μm, stoved 10 minutes at 180° C.) were introduced for 4 hours at 95° C. into a 0.2% aqueous solution of a commercial detergent based on pentasodium tripolyphosphate, sodium metal silicate, soda, ethoxylated nonyl phenol (10 ethylene oxide units per mol of phenol) and cyanuric acid chloride.

The sheets are rinsed in cold water and again exposed for 4 hours to a 0.3% solution of the above detergent at 95° C. Detergent resistance was confirmed when this test cycle (total of 480 minutes) could be carried out twice without the lacquer films becoming dull or forming blisters.

TABLE

| White lacquer | Data and test results | | | |
|---|---|---|---|---|
|  | 1a | 2a | 3a | Comparison 1a |
| A. Data. | | | | |
| Acid number of copolymer | 26 | 27 | 25 | 26 |
| Solid content (%) | 53.5 | 54 | 54 | 53.5 |
| Viscosity of binder, 40% in ethyl glycol according to DIN 53 211 (sec) | 36 | 32 | 45 | 39 |
| B. Test results | | | | |
| Gloss according to Gardner 20° angle (ASTM 523) | 50 | 54 | 48 | 43 |
| Detergent resistance test (min) after 3 weeks' storage at RT | (sat.)* | (sat.) | (sat.) | (unsat.) |

| White lacquer | 1b | 2b | 3b | comparison 1b |
|---|---|---|---|---|
| A. Data | | | | |
| Acid number of copolymer | 26 | 27 | 25 | 26 |
| Solid content (%) | 53.5 | 54 | 54 | 53.5 |
| Viscosity of binder, 40% in ethyl glycol according to DIN 53 211 (sec) | 36 | 32 | 45 | 39 |
| B. Test results | | | | |
| Gloss according to Gardner 20° angle (ASTM 523) | 60 | 62 | 53 | 49 |
| Detergent resistance test (min) after 3 weeks' storage at RT | (sat.) | (sat.) | (sat.) | (unsat.) |

*(sat.) = satisfactory

We claim:

1. A water-dilutable lacquer binder comprising a mixture of
    A. 50-94% by weight of a copolymer comprising copolymerised units of
        a. 30-65% by weight of an aromatic vinyl or isopropenyl compound having 8-14 C-atoms or of a methacrylic acid alkyl ester having 1-4 C-atoms in the alcohol component or a mixture thereof;
        b. 10-30% by weight of at least one acrylic acid alkyl ester having 1-8 C-atoms in the alcohol component;
        c. 1-20% by weight of maleic acid, fumaric acid, itaconic acid or a semiester thereof having 1-8 C-atoms in the alcohol component, (meth)acrylic acid or a mixture of these monomers;
        d. 0-20% by weight of at least one hydroxyalkyl ester of (meth)acrylic acid having 2-4 C-atoms in the alkyl group or glycidyl(meth)acrylate or a mixture of these monomers;
        e. 10-30% by weight of N-methylol(meth)acrylic acid amide or N-methoxymethyl(meth)acrylic acid amide and
        f. 2-40% by weight of a reaction product of an allyl glycidyl ether and aliphatic, cycloaliphatic, araliphatic or an aromatic monocarboxylic acid having 2-30 C-atoms or a mixture thereof;
    B. 6-50% by weight of an aminoplast resin; and
    C. 0-30% by weight, based on copolymer, of a lactam, 30-100% of the number of carboxyl groups of component A.c incorporated in the copolymer blend neutralised by ammonia or mono- or polyamines.

2. A water-dilutable lacquer binder according to claim 1, wherein component A.f is a reaction product of an allylglycidyl ether with α-ethyl hexanoic acid or isononanoic acid.

3. A water-dilutable lacquer binder according to claim 1, wherein component B is a condensation product of an aldehyde and melamine or urea.

4. A water-dilutable lacquer binder according to claim 1, wherein component C is ε-caprolactam.

* * * * *